United States Patent [19]

Okuma et al.

[11] Patent Number: 4,902,792

[45] Date of Patent: Feb. 20, 1990

[54] FINE CELLULOSE PARTICLES AND PROCESS FOR PRODUCTION THEREOF

[75] Inventors: Shigeru Okuma; Kanji Yamagishi; Masami Hara, all of Hofu; Keizo Suzuki, Osaka; Toshihiro Yamamoto, Hofu, all of Japan

[73] Assignees: Kanebo Ltd., Tokyo; Kanebo Rayon, Ltd., Osaka, both of Japan

[21] Appl. No.: 139,860

[22] Filed: Dec. 30, 1987

Related U.S. Application Data

[62] Division of Ser. No. 853,514, Apr. 18, 1986, abandoned.

[30] Foreign Application Priority Data

Apr. 19, 1985 [JP] Japan .................. 60-82632
Oct. 2, 1985 [JP] Japan .................. 60-218135
Nov. 21, 1985 [JP] Japan .................. 60-259832
Feb. 25, 1986 [JP] Japan .................. 61-38382

[51] Int. Cl.$^4$ .......................... C08B 3/32; C08B 5/16; C08B 16/00
[52] U.S. Cl. ........................ 536/57; 536/60; 536/61; 428/402
[58] Field of Search .................. 536/57, 60, 61

[56] References Cited

U.S. PATENT DOCUMENTS

| | | | |
|---|---|---|---|
| 3,336,144 | 8/1967 | Bridgeford et al. | 536/61 |
| 3,536,697 | 10/1970 | Kolosh et al. | 536/60 |
| 4,098,996 | 7/1978 | Ryan et al. | 536/60 |

FOREIGN PATENT DOCUMENTS

| | | | |
|---|---|---|---|
| 269002 | 4/1964 | Australia | 536/57 |
| 48-43082 | 6/1973 | Japan . | |
| 938743 | 10/1963 | United Kingdom | 536/57 |

OTHER PUBLICATIONS

Chemical Abstracts, vol. 80, 1974, Abstract No. 49507m.

*Primary Examiner*—Ronald W. Griffin
*Attorney, Agent, or Firm*—Flynn, Thiel, Boutell & Tanis

[57] ABSTRACT

A process for producing fine cellulose particles, which comprises
(1) mixing viscose with a water-soluble anionic polymeric compound or polyethylene glycol or its derivative to form a dispersion of fine particles of viscose,
(2) (i) heating the dispersion or mixing it with a coagulating agent to thereby coagulate the viscose in the dispersion, and thereafter neutralizing it with an acid to form fine particles of cellulose, or (ii) coagulating and neutralizing the dispersion with an acid to form fine particles of cellulose, and
(3) thereafter, separating the fine particles of cellulose from the motor liquor. The fine cellulose particles
(a) are composed substantially of II-type cellulose,
(b) have a crystallinity, of 5 to 35% by weight,
(c) are composed substantially of particles of not more than 20 micrometers, and
(d) have a sharp particle size distribution.

42 Claims, 5 Drawing Sheets

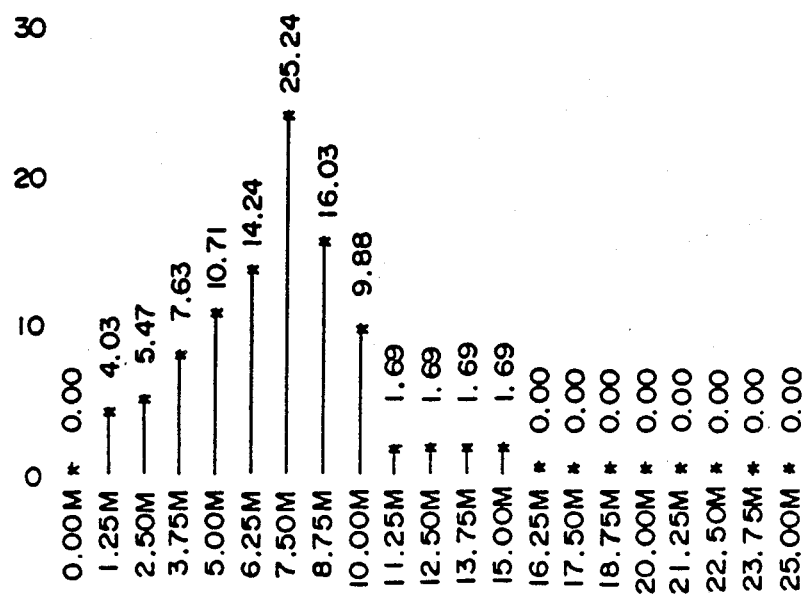
FIG. I(A)
AVERAGE AT 50 WT% = 6.64μ
SPECIFIC SURFACE AREA = 8902.4 cm²/g
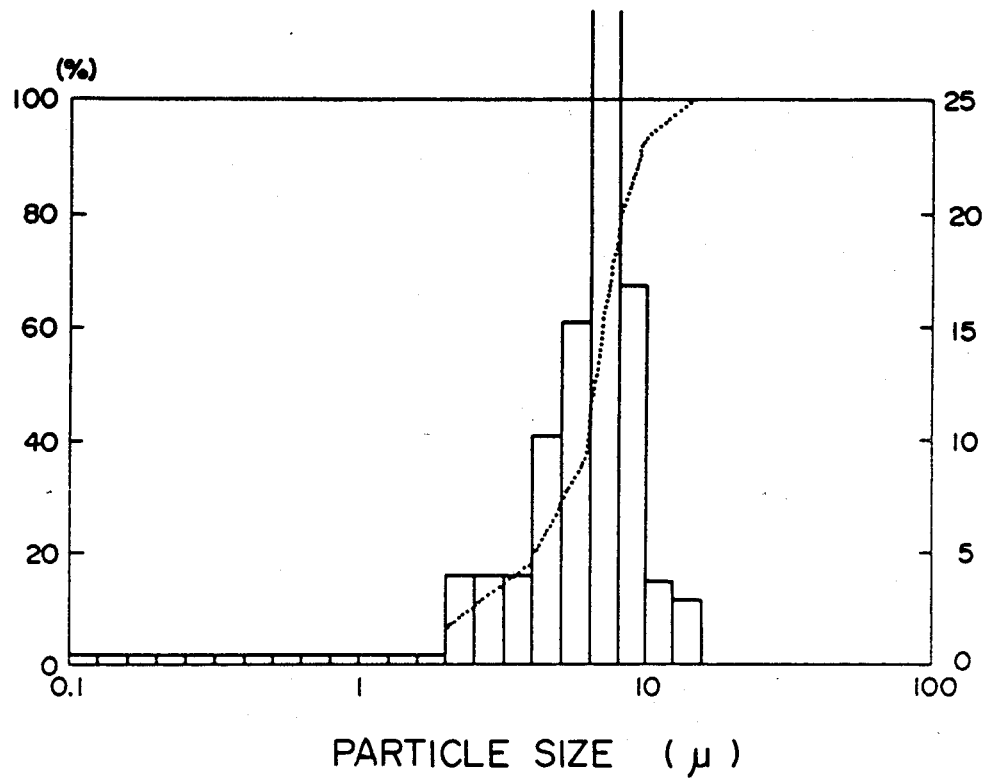
FIG. I(B)

FINE CELLULOSE PARTICLES AND PROCESS FOR PRODUCTION THEREOF

BACKGROUND OF THE INVENTION

1. Field of the Invention

This invention relates to fine cellulose particles and a process for production thereof. More specifically, this invention relates to fine cellulose particles composed substantially of regenerated cellulose and having a sharp particle size distribution, and a process for production thereof.

Particles of cellulose or its derivatives have recently found extensive use in various fields as chromatographic materials, polymeric carriers, cosmetic additives, lubricants, etc.

2. Description of the Prior Art

Previously, highly pure microcrystalline cellulose developed by FMC Corporation of U. S. A. was well known as fine cellulose particles. It is known that this highly pure microcrystalline cellulose is produced by hydrolyzing a purified pulp of an especially high purity with a mineral acid under certain conditions, removing the non-crystalline region by washing, thereafter milling, purifying and drying the hydrolyzed product (see the pamphlet entitled "Crystalline Cellulose, Avicel ®", published on March 1, 1983 by Asahi Chemical Industry Co., Ltd.). It is seen from the pamphlet that this highly pure microcrystalline cellulose is chemically natural cellulose itself, i.e. I-type cellulose, and is available in an average particle diameter of from about 6 micrometers to about 40 micrometers or even to about 120 micrometers. Investigations of the present inventors have shown that this highly pure microcrystalline cellulose (Grade PH-M06) has a crystallinity of as good as about 31 to 35%.

Japanese Laid-Open Patent Publication No. 21738/1973 discloses a method in which viscose having an average degree of polymerization of at least 400 is gradually coagulated and regenerated by dropping it in particles onto a coagulating regenerating bath having a low acid concentration and a low anhydrous sodium sulfate concentration. A working example in this patent document describes regenerated cellulose particles having a size of 30 to 46 mesh (300 to 590 micrometers).

Japanese Patent Publication No. 21,761/1981 discloses a method which comprises extruding viscose from an extrusion opening, allowing its continuous flow to change spontaneously into a flow of liquid droplets in air, and thus supplying it into a coagulating and regenerating bath as nearly spherical liquid droplets. This patent document states that the method gives cellulose particles having a size of 16 to 170 mesh (88 to 1168 micrometers).

Japanese Patent Publication No. 7162/1982 discloses hollow fine particles of regenerated cellulose having a large void nearly centrally. It describes that these particles have an apparent density of not more than 0.4 g/cm$^3$, and a size of 16 to 170 mesh.

Japanese Laid-Open Patent Publication No. 60753/1973 discloses a method of producing porous regenerated cellulose particles having a size of 16 to 170 mesh by using a coagulating and regenerating bath having a higher acid concentration and a higher anhydrous sodium sulfate concentration than in the method disclosed in Japanese Laid-Open Patent Publication No. 21738/1973 cited above.

Japanese Patent Publication No. 89,748/1974 discloses a method of producing a cellulose powder having a length/diameter ratio of from 20/1 to 2/1 and a length of not more than 1 mm, which comprises regenerating a fibrous material of regenerated cellulose and drying and pulverizing the hydrolyzed product.

Japanese Laid-Open Patent Publication No. 212,231/1982 discloses a method of producing a cellulose powder from a fibrous material of natural cellulose in the same way as above.

Japanese Patent Publication No. 45,254/1982 discloses that by heating a suspension of viscose in a water-immiscible liquid such as chlorobenzene to a temperature of 30° to 100° C. with continuous stirring, solidifying it and then decomposing the resulting particles with an acid, particles comprising 85% by volume of particles having a particle diameter of 150 to 350 micrometers (Example 1) are obtained.

Japanese Patent Publication No. 39565/1980 discloses a method of preparing spherical cellulose particles which comprises adding dropwise a solution of cellulose triacetate in methylene chloride or chloroform to an aqueous medium having dissolved in it a dispersing agent such as gelatin or polyvinyl alcohol with stirring, heating the mixture to form spherical particles of cellulose triacetate, and thereafter saponifying the resulting particles. A working example of this patent document discloses cellulose particles having a size of 30 to 500 micrometers.

Japanese Patent Publication No. 40618/1980 discloses a method of producing cellulose particles having a size of 50 to 500 micrometers from cellulose esters other than cellulose triacetate by the same method as above.

Japanese Laid-Open Patent Publication No. 28,763/1980 discloses a method of producing microspherical particles which comprises spray drying a solution of a fatty acid ester of cellulose in a mixture of at least three solvents having a boiling point difference of at least 30° C. from each other.

U. S. Patent No. 4,312,980 and European Laid-Open Patent Publication No. 25639 disclose a method of producing porous spherical particles of cellulose, which comprises suspending in an aqueous medium a solution of cellulose triacetate in a mixture of a chlorinated hydrocarbon having a boiling point lower than the aqueous medium and an aliphatic higher alcohol having at least 6 carbon atoms to thereby form droplets of the solution, thereafter removing the chlorinated hydrocarbon from the droplets by evaporation, saponifying the resulting spherical particles of cellulose triacetate containing the aliphatic higher alcohol, and then removing the aliphatic higher alcohol. Working examples of these patent documents disclose particles having a particle diameter of 100 to 200 micrometers.

Japanese Laid-Open Patent Publication No. 24430/1981 discloses a method of producing porous spherical particles of cellulose, which comprises suspending in an aqueous medium a solution of crystalline cellulose triacetate having a certain degree of polymerization in a chlorinated hydrocarbon having a lower boiling point than the aqueous medium to thereby form droplets of the solution, thereafter removing the chlorinated hydrocarbon from the droplets by evaporation, and saponifying the resulting spherical particles of cellulose triacetate. A working example of this patent document describes porous spherical particles of cellulose having a particle diameter of 100 to 200 micrometers.

European Laid-Open Patent Publication No. 47064 (corresponding to U. S. Patents Nos. 4,390,691 and 4,461,892) describes a method of producing porous spherical cellulose particles, which comprises suspending a solution of an organic acid ester of cellulose in a solvent composed mainly of a chlorinated hydrocarbon to thereby form droplets of the solution, evaporating the chlorinated hydrocarbon solvent from the droplets to thereby form spherical particles of the organic acid ester of cellulose, and thereafter saponifying the spherical particles; wherein an acid or an alkali is added to, and mixed with, the solution of the organic acid ester of cellulose before it is suspended in the aqueous medium. A working example of this patent document describes porous spherical cellulose particles having a particle diameter of 50 to 100 micrometers.

Japanese Laid-Open Patent Publication No. 159,801/1982 discloses a process for producing a granular cellulose gel, which comprises dissolving cellulose in a solution of paraformaldehyde in dimethyl sulfoxide, dispersing the resulting solution in a liquid, mixing the dispersion with a coagulating agent for cellulose, gelling and flocculating the dispersed liquid droplets of cellulose, and as required, regenerating the cellulose with hot water.

Japanese Laid-Open Patent Publication No. 159,802/1982 discloses a method of producing porous cellulose which comprises immersing granular cellulose in a solution of para-formaldehyde in dimethyl sulfoxide, and heating the immersed cellulose to swell it.

Japanese Laid-Open Patent Publication No. 219,333/1982 discloses a method of producing fine spherical particles of cellulose acetate, which comprises mixing a solution of cellulose acetate in an organic solvent and an aqueous medium containing a dispersant, a surface-active agent and a defoamer for at least 10 seconds with stirring at a rotating speed of at least 2000 rpm while maintaining the peripheral speed of the rotating blade at at least 450 m/min., and then evaporating the organic solvent from the mixture.

Japanese Laid-Open Patent Publication No. 30,752/1973 discloses a method of producing a cellulose powder which comprises treating cellulose with tetrahydrofuran, and then pulverizing it.

Japanese Laid-Open Patent Publication No. 105,758/1975 discloses a method of producing a fine powder of cellulose which comprises passing a sheet of dry cellulose under pressure through a pair of rotating rolls, and thereafter hydrolyzing it with a mineral acid.

SUMMARY OF THE INVENTION

It is an object of this invention to provide fine cellulose particles composed substantially of regenerated cellulose, or II-type cellulose, and having a sharp particle size distribution.

Another object of this invention is to provide fine particles of II-type cellulose having an average particle diameter of as small as not more than 20 micrometers and such a sharp particle size distribution that the proportion of particles having a particle diameter in the range of the average particle diameter ±5 micrometers is at least 70% by weight based on the entire particles.

Still another object of this invention is to provide a novel process for producing fine cellulose particles composed substantially of regenerated cellulose or II-type cellulose and having a sharp particle size distribution and an average particle diameter of not more than 300 micrometers, particularly not more than 30 micrometers.

Yet another object of this invention is to provide the novel process mentioned above comprising a step of forming a viscose dispersion by mixing viscose with a particular ionic or nonionic polymeric compound.

A further object of this invention is to provide a process for producing fine spherical particles of cellulose having a particle diameter of several tens of micrometers or below, particlularly several micrometers or below, which comprises mixing viscose with both a water-soluble anionic polymeric compound and a cationic polymeric compound.

A still further object of this invention is to provide fine particles of II-type cellulose which have a sharp particle size distribution, and therefore, can be used in various fields either as such or as a mixture with other particles having different particle size distributions.

Additional objects of this invention along with its advantages will become apparent from the following description.

Firstly, these objects and advantages of this invention are achieved by a first process for producing fine cellulose particles, which comprises (1) mixing viscose with at least a water-soluble anionic polymeric compound to form a dispersion of fine particles of viscose, (2) (i) heating the dispersion or mixing it with a coagulating agent to thereby coagulate the viscose in the dispersion, and thereafter neutralizing it with an acid to form fine particles of cellulose, or (ii) coagulating and neutralizing the dispersion with an acid to form fine particles of cellulose, and (3) thereafter, separating the fine particles of cellulose from the mother liquor, and as required, subjecting them to removal of sulfur, washing with an acid, washing with water, or drying.

Step (1) includes one preferred embodiment in which viscose is mixed with the aqueous anionic polymeric compound and a cationic compound.

Secondly, the above objects and advantages of the invention are achieved by a second process for producing fine cellulose particles, which comprises (1) mixing viscose with a water-soluble polyethylene glycol or its derivative having a number average molecular eight of at least 1,500 at a temperature of at least 55° C. to form a dispersion of fine particles of viscose, (2) (i) heating the dispersion at a temperature equal to, or higher than, the temperature used in forming the dispersion, or mixing the dispersion with a coagulating agent to thereby coagulate the viscose in the dispersion, and thereafter neutralizing it with an acid to form fine particles of cellulose, or (ii) coagulating and neutralizing the above dispersion with an acid to form fine particles of cellulose, and (3) thereafter, separating the fine particles of cellulose from the mother liquor, and as required, subjecting them to removal of sulfur, washing with an acid, washing with water, or drying.

Of the fine cellulose particles produced by the processes of this invention, those having the following properties have been provided for the first time by this invention and constitute part of this invention.

(a) They are composed substantially of II-type cellulose;

(b) they have a crystallinity, determined by X-ray diffractometry, of 5 to 35%;

(c) they are composed substantially of spherical or elongated spherical particles having an average particle diameter of not more than 20 micrometers; and (d) they have such a particle size distribution that the proportion of particles having a particle diameter in the range of the average particle diameter (micrometers) ±5 micrometers is at least 70% by weight of the entire particles.

BRIEF DESCRIPTION OF THE ACCOMPANYING DRAWINGS

FIG. 1(A) is a chart of the particle size distribution of the fine cellulose particles obtained in Example 1.

FIG. 1(B) is a graph of the particle size distribution data of FIG. 1(A).

DETAILED DESCRIPTION OF THE INVENTION

Figure 2:
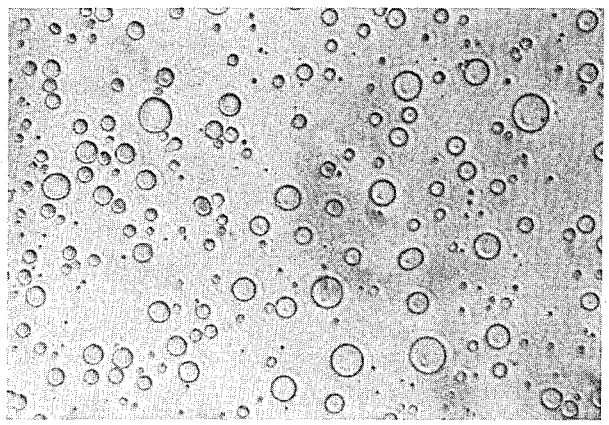
FIG. 2 is a photograph showing the state of dispersion of viscose particles for the production of celluose particles in accordance with the first process of this invention.

The first process of this invention will now be described in detail.

According to the first process, a dispersion of fine particles of viscose is formed in the first step; fine particles of cellulose are formed in the second step; and the fine particles of cellulose are separated from the mother liquor in the third step.

The first step of forming the dispersion of fine particles of viscose is carried out by mixing viscose with a water-soluble anionic polymeric compound.

The viscose used, for example, has a gamma value of 30 to 100, preferably 35 to 90; a salt point of 3 to 20, preferably 4 to 18; a cellulose concentration of 3 to 15% by weight, preferably 5 to 13% by weight; an alkali concentration of 2 to 15% by weight, preferably 4 to 13% by weight; an alkali (as sodium hydroxide) weight proportion, based on cellulose, of 40 to 100% by weight, preferably 50 to 90% by weight; and a viscosity at 20° C. of 50 to 20,000 centipoises, preferably 80 to 18,000 centipoises.

The pulp source of viscose is preferably linter pulp derived from either a coniferous tree or a broad-leaved tree. The viscose as cellulose has an average degree of polymerization of usually 110 to 1,000.

The water-soluble anionic polymeric compound has a sulonic acid group, a phosphonic acid group or a carboxyic acid group as an anionic group. These anionic groups may be in the form of a free acid group or a salt thereof.

The sulfonic acid group may be derived from, for example, vinylsulfonic acid, styrenesulfonic acid, methylstyrenesulfonic acid, allylsulfonic acid, methallylsulfonic acid, acrylamidomethylpropanesulfonic acid, or salts of these.

The phosphonic acid group may be derived, for example, from styrenephosphonic acid, vinylphosphonic acid or salts of these.

The carboxylic acid group may be derived from acrylic acid, methacrylic acid, styrenecarboxylic acid, maleic acid, itaconic acid or salts of these acids.

A water-soluble anionic polymeric compound having the carboxylic acid group may, for example, be supplied as a homopolymer or copolymer containing sodium acrylate units by polymerizing sodium acrylate or a mixture of it with a copolymerizable monomer in a customary manner. Furthermore, by sulfonating a homopolymer of styrene, a water-soluble anionic polymeric compound having a sulfonic acid group may be produced.

The same can be said when the sulfonic acid group is derived from monomers other than styrenesulfonic acid, and when the phosphonic acid group and carboxylic acid group are derived from the aforesaid monomers.

The water-soluble anionic polymeric compound preferably contains at least 20 mole % of units derived from such a monomer as described above which has the anionic group. Such a preferred polymeric compound includes both a homopolymer and a copolymer.

The water-soluble anionic polymeric compound has a number average molecular weight of preferably at least 5,000, more preferably 10,000 to 3,000,000.

The water-soluble anionic polymeric compound in this invention is not limited to the vinyl-type polymers described above, and may include carboxymethyl cellulose, sulfoethyl cellulose, and salts (e.g., Na salt) of these.

In one preferred embodiment of the first process of the invention, the first step of forming the dispersion of fine particles of viscose is carried out by mixing viscose with both the water-soluble anionic polymeric compound and a cationic polymeric compound. According to this preferred embodiment, spherical, not elongated spherical, fine cellulose particles having a particle diameter of less than several tens of micrometers, especially less than several micrometers, can be produced very easily. These spherical particles can be produced easily even when the amount of the water-soluble anionic polymeric compound is used in a smaller amount than in the case of using it alone or the stirring of the compounds during mixing with viscose is less intense.

The cationic compound is, for example, a polymeric compound having an ammonium group as a cationic group, and preferably has water-solubility. Polymeric compounds having quaternary ammonium salt groups as the anionic group are preferred.

Examples of the cationic polymeric compound include ammonium salts represented by the following formula (I)

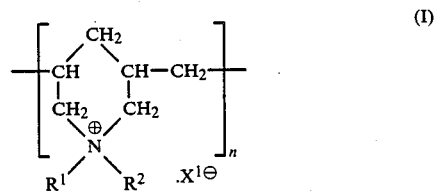

wherein $R^1$ and $R^2$ are identical or different and each represents a hydrogen atom, a lower alkyl group having 1 to 5 carbon atoms or a benzyl group, $X^1$ represents one equivalent of an anion, and n is a number showing the degree of polymerization, ammonium salts represented by the following formula (II)

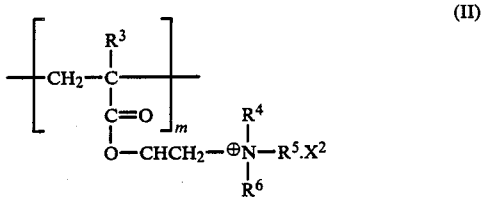

wherein $R^3$ represents a hydrogen atom or a methyl group, $R^4$, $R^5$ and $R^6$ are identical or different and each represents a hydrogen atom, a lower alkyl group having 1 to 5 carbon atoms, or a benzyl group, $X^2$ represents one equivalent of an anion, and m is a number showing the degree of polymerization, and ammonium salts represented by the following formula (III)

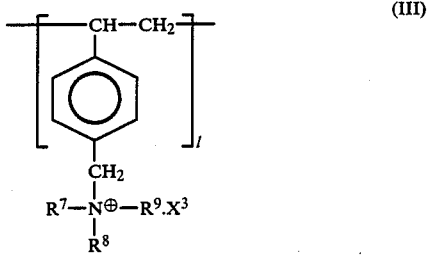

wherein $R^7$, $R^8$ and $R^9$ are identical or different and each represents a hydrogen atom, a lower alkyl group having 1 to 5 carbon atoms or a benzyl group, $X^3$ represents one equivalent of an anion, and l is a number showing the degree of polymerization.

In formula (I) above, $R^1$ and $R^2$ are identical or different and each represents a hydrogen atom, a lower alkyl group having 1 to 5 carbon atoms or a benzyl group. The lower alkyl group may be linear or branched, and includes, for example, methyl, ethyl, n-propyl, isopropyl, n-butyl, sec-butyl, iso-butyl, t-butyl and n-pentyl. Methyl and ethyl are preferred as the lower alkyl group. $X^1$ is one equivalent of an anion such as a chlorine ion, a bromine ion, or a hemisulfate ion. The number n showing the degree of polymerization is, for example, 5 to 1,500, preferably 8 to 1,200.

In formula (II), specific examples of the lower alkyl represented by $R^4$, $R^5$ and $R^6$ and one equivalent of an anion represented by $X^2$ are the same as those given for the lower alkyl group and one-equivalent of an anion in formula (I). In formula (II), m is a number representing the degree of polymerization and is, for example, 3 to 1,000, preferably 5 to 800.

Examples of the cationic polymer compound [including the ammonium salts of formulae (I), (II) and (III)] include poly(N,N-dimethyl-3,5-methylenepiperizium chloride), poly(N,N-diethyl-3,5-methylenepiperizium chloride), polyvinylbenzyltrimethyl ammonium chloride, polyvinylbenzyltriethyl ammonium chloride, polymethacryloxyethyltrimethyl ammonium chloride and polymethacryloxyethyltriethyl ammonium chloride.

The cationic polymeric compounds have a number average molecular weight of, for example, 500 to 150,000, preferably 1,000 to 100,000, more preferably 3,000 to 70,000.

In the preferred embodiment, the dispersion can be formed in step (1) by, for example, simultaneously mixing viscose, the water-soluble anionic polymeric compound and the cationic polymeric compound, or by first mixing viscose with the water-soluble anionic polymeric compound and then mixing the resulting mixture with the cationic polymeric compound.

The water-soluble anionic polymer compound is used preferably as an aqueous solution, more preferably as an aqueous solution in which the concentration of the polymeric compound is 0.5 to 25% by weight, especially 2 to 22% by weight. The aqueous solution of the water-soluble anionic polymeric compound preferably has a viscosity of 30,000 to 50,000 centipoises at 20° C.

When viscose is first mixed with the cationic polymeric compound and then with the water-soluble anionic polymeric compound, viscose is liable to coagulate, and therefore, the mixing operation should be carried out with utmost care.

The amount of the water-soluble anionic polymeric compound to be mixed is 0.3 to 100 parts by weight, preferably 1 to 45 parts by weight, especially preferably 4 to 20 parts by weight, per part by weight of cellulose.

When the cationic polymeric compound is used together, its amount is preferably 0.0005 to 0.4 part by weight, more preferably 0.001 to 0.3 part by weight, especially preferably 0.003 to 0.2 part by weight, per part by weight of the water-soluble anionic polymeric compound.

Mixing in step (1) may be effected by any means which can lead to the formation of the dispersion of fine viscose particles. For example, it can be carried out by mechanical stirring with stirring vanes or baffles, ultrasonic stirring, or mixing with a static mixer, either singly or in combination.

Advantageously, the mixing is carried out at a temperature lower than the boiling point of carbon dioxide contained in the viscose, preferably at 0° to 40° C..

The dispersion of fine viscose particles formed in the first step is then coagulated and neutralized in the second step to form fine particles of cellulose. Coagulation and neutralization may be carried out simultaneously or at different times.

When coagulation and neutralization are to be carried out at different times, the coagulation may be effected by heating the dispersion or mixing the dispersion with a coagulating agent. The neutralization can be effected by subsequently contacting the coagulated product with an acid.

Desirably, the coagulation reaction is carried out while the resulting dispersion is being mixed. The mixing operation may be carried out by any means, and for example, as in the step of forming the dispersion of fine particles, it may be carried out by using stirring vanes or the like.

In the embodiment in which the cationic polymeric compound is used, true spherical particles having an average particle diameter of not more than 20 micrometers can be easily obtained by performing the first and second steps under relatively mild shearing conditions, for example by using stirring vanes at a peripheral speed of not more than 200 m/min. and a rotating speed of not more than 1,000 rpm. This is one great advantage of the preferred embodiment in view of the fact that for example, the peripheral speed and rotating speed of the stirring vanes must be made larger than when fine particles are to be formed without using the cationic polymeric compound. The preferred embodiment also has the advantage that under low shear, the deformation of particles, for example the occurrence of elongated spherical particles, under high shear can be inhibited.

Coagulation by heating can be advantageously carried out at a temperature above the boiling point of carbon disulfide contained in viscose, for example at 50° to 90° C. Coagulation with a coagulating agent needs not to be carried out at such an elevated temperatures, and temperatures of 0° to 40° C. usually suffice. Examples of the coagulating agent are lower aliphatic alcohols, alkali metal salts or alkaline earth metal salts of inorganic acids, inorganic acids, and organic acids, and mixtures of these with each other or with water-soluble polymeric compounds such as polyethylene glycol or its derivatives. The lower aliphatic alcohols may be linear or branched and are preferably aliphatic alcohols having 1 to 4 carbon atoms such as methanol, ethanol, isopropanol, n-propanol and n-butanol. Examples of the inorganic acids are hydrochloric acid, sulfuric acid, phosphoric acid and carbonic acid. The alkali metal salts of inorganic acids are preferably sodium salts such as NaCl and $Na_2SO_4$ and potassium salts such as $K_2SO_4$. The alkaline earth metal salts of inorganic acids are preferably magnesium salts such as $MgSO_4$ and calcium salts such as $CaCl_2$. The organic acids are preferably carboxylic acids and sulfonic acids, such as formic acid, acetic acid, propionic acid, benzoic acid, benzenesulfonic acid, toluenesulfonic acid, maleic anhydride, malic acid and oxalic acid.

The coagulating agent is used in a proportion of about 20 to 300% by weight based on cellulose in the viscose.

The acid used as a neutralizing agent preferably includes, for example, an inorganic strong acid such as sulfuric acid or hydrochloric acid.

The neutralizing agent is used in an amount sufficient to neutralize viscose, and fine particles of cellulose can be formed.

As stated above, the coagulation and neutralization in the second step may be carried out simultaneously. An acid, preferably an inorganic strong acid such as hydrochloric or sulfuric acid, is an effective agent for the coagulation and neutralization. The acid used in an amount sufficient to neutralize viscose is sufficient for the coagulation and neutralization process. The simultaneous coagulation and neutralization are carried out advantageously at a temperature of, for example, 0°0 to 40° C.

According to the first process of the invention, the fine particles of cellulose formed in the second step are then separated in the third step from the mother liquor, and as required, subjected to removal of sulfur, washing with an acid, washing with water or drying. If desired, bleaching may be carried out after acid washing. The separation of the fine particles from the mother liquor can be carried out, for example, by filtration or centrifugal separation. The removal of sulfur may be carried out by using an aqueous solution of an alkali such as sodium hydroxide and sodium sulfide. As required, the remaining alkali may be removed by washing with an acid such as dilute hydrochloric acid, and the product is washed with water and dried.

Now, the second process of this invention will be described below in detail.

According to the second process, a dispersion of fine particles of viscose is formed in the first step; fine particles of cellulose are formed in the second step; and the fine cellulose particles are separated from the mother liquor. The general procedure of the second process, therefore, is not different from the first process.

The first step of forming the dispersion of fine particles of viscose is carried out by mixing viscose with a water-soluble polyethylene glycol or its derivative having a number average molecular weight of at least 1,500.

The viscose used may be the same as that described in the description of the first process.

The polyethylene glycol or its derivative has a number average molecular weight of at least 1,500, preferably 1,500 to 400,000.

Examples of suitable polyethylene glycol derivatives include water-soluble compounds obtained by blocking only the hydroxyl group at one end of polyethylene glycol with an alkyl group having 1 to 18 carbon atoms, a phenyl group substituted by an alkyl group having 1 to 18 carbon atoms, or an acyl group having 2 to 18 carbon atoms, and A—B—A' type block copolymers (in which A and A' are identical or different and represent a polyethylene oxide block, and B represents a polypropylene oxide block). Specific examples include polyethylene glycol monomethyl ether, polyethylene glycol monolauryl ether, polyethylene glycol monocetyl ether, polyethylene glycol monomethylphenyl ether, polyethylene glycol monononylphenyl ether, polyethylene glycol monoacetate, polyethylene glycol monolaurate, and polyoxyethylene block-polyoxypropylene block-polyoxyethylene block copolymer.

Polyethylene glycol is preferred among the polyethylene glycol and its derivatives. Polyethylene glycol has a number average molecular weight of preferably 6,000 to 200,000, more preferably 8,000 to 100,000, especially preferably 10,000 to 30,000. The polyethylene glycol derivative preferably has a number average molecular weight of 1,500 to 16,000.

According to the second process of the invention, viscose is first mixed with the water-soluble polyethylene glycol or its derivative by any means which can lead to the formation of a dispersion of fine particles of viscose. Specific means are the same as those described above with regard to the first process.

The water-soluble high-molecular-weight polyethylene glycol or its derivative is used preferably as an aqueous solution, more preferably as an aqueous solution in which the concentration of polyethyene glycol or its derivative is 0.5 to 60% by weight, especially 5 to 55% by weight, above all 10 to 40% by weight.

The polyethylene glycol or its derivative is used in an amount of 1 to 30 parts by weight, preferably 2 to 28 parts by weight, especially preferably 4 to 24 parts by weight, above all 8 to 16 parts by weight, per part by weight of cellulose. The temperature at which viscose is mixed with the polyethylene glycol or its derivative is not particularly restricted. Desirably, the mixing is carried out at a temperature lower than the temperature at which the dispersion of fine particles of viscose is formed. The dispersion of fine particles of viscose is formed at a temperature of at least 55° C. At temperatures lower than 55° C., it is impossible to obtain the dispersion of fine particles of viscose which is a basis for giving fine particles of cellulose.

According to the second process, the dispersion of fine particles of viscose is then coagulated and neutralized in the second step to form fine particles of cellulose. The coagulation and neutralization may be carried out simultaneously or at different times.

When coagulation and neutralization are to be carried out at different times, the coagulation may be effected by heating the dispersion or mixing the dispersion with a coagulating agent. The neutralization can be effected by subsequently contacting the coagulated product with an acid.

Desirably, the coagulation reaction is carried out while the resulting dispersion is being mixed.

The coagulation reaction is carried out at a temperature equal to, or higher than, the temperature at which the dispersion is formed. Coagulation by heating or by using a coagulating agent is preferably carried out at a temperature of 60° to 90° C.

The coagulating agent and its amount are the same as described above with regard to the first process.

The use of a combination of the coagulating agent and polyethylene glycol or its derivative in coagulation brings about the advantage that the decrease in the concentration of polyethylene glycol or its derivative in the dispersion by the addition of the coagulating agent can be prevented and the dispersion can be coagulated stably.

The acid used as a neutralizing agent is preferably an inorganic strong acid such as sulfuric acid or hydrochloric acid.

The neutralizing agent is used in an amount sufficient to neutralize viscose, and fine particles of cellulose are formed. As stated above, the coagulation and neutralization in the second step may be carried out simultaneously. An inorganic strong acid such as hydrochloric acid or sulfuric acid is preferably an effective agent for coagulation and neutralization. The acid used in an amount sufficient to neutralize viscose is also sufficient for coagulation and neutralization. Advantageously, the simultaneous coagulation and neutralization are carried out at a temperature of 60° to 90° C.

According to the second process of this invention, the fine particles of cellulose formed in the second step are then treated in the third step under the same conditions as described above with regard to the first process.

As a result, the present invention can very easily give fine cellulose particles composed substantially of II-type cellulose. The fine cellulose particles having a relatively sharp particle size distribution are an aggregate of particles having an average particle diameter of, for example, about 1 to 200 micrometers.

Preferred fine cellulose particles provided by this invention are characterized in that:

(a) they are composed substantially of II-type cellulose, (b) they have a crystallinity, determined by X-ray diffractometry, of 5 to 35%, (c) they are composed substantially of spherical or elongated spherical particles having an average particle diameter of not more than 20 micrometers, and (d) they have such a particle size distribution that the proportion of particles having a particle diameter in the range of the average particle diameter (micrometers) ±5 micrometers is at least 70% of the entire particles.

The fine cellulose particles of this invention are characterized by having the above requirements (a) to (d). These requirements will be described below.

The fine cellulose particles of this invention are composed substantially of II-type cellulose, i.e. regenerated cellulose. Accordingly, fine cellulose particles composed of natural cellulose, i.e. I-type cellulose, completely differ from the fine particles of this invention. As is well known, II-type cellulose and I-type cellulose are distinguished from each other by X-ray diffractometery. The X-ray diffraction pattern of II-type cellulose does not substantially have a diffraction peak at a diffraction angle $2\theta = 15°$ which exists clearly in I-type cellulose.

The fine cellulose particles of the invention is characterized by having a crystallinity, determined by X-ray diffractometry, of 5 to 35%, preferably 10 to 28%, especially preferably 15 to 26%. The fine cellulose particles of the invention are not amorphous, but crystalline as specified by the above crystallinity.

The fine cellulose particles of the invention are composed substantially of spherical or elongated spherical particles having an average particle diameter of not more than 20 micrometers. The fine cellulose particles of the invention are furthermore composed substantially of spherical to elongated spherical particles having an average particle diameter of 1 to 18 micrometers, preferably 1.5 to 15 micrometer. The "elongated spherical" as used in this application is a generic concept embracing such a shape as an ellipse, a long-stretched circle, a peanut-like shape or an oval shape in the projection chart or top plan view of a particle. The fine particles of cellulose in this invention are spherical or elongated spherical, and therefore differ from angled or irregularly shaped particles. The elongated spherical particles of cellulose are liable to form if the dispersion formed in the first step is coagulated in the second step while viscose and the water-soluble anionic polymeric compound are being mixed too vigorously. The fine cellulose particles of this invention have a very sharp particle size distribution such that the proportion of particles having a particle diameter in the range of the average particle diameter ±5 micrometers is at least 70% by weight based on the entire particles. For example, when the entire particles have an average particle diameter of 10 micrometers, the proportion of particles having a particle diameter in the range of 5 to 15 micrometers is at least 70% by weight based on the entire particles. When the average particle diameter is 3 micrometers, the above range of the average particle diameter ±5 micrometers should be understood to be more than 0 but not more than 8 micrometers since the lower limit is never 0 or below.

The proportion of particles having an average particle diameter ±5 micrometers in the fine cellulose particles is at least 75% by weight in the case of a sharper size distribution, at least 80% by weight in the case of a much sharper size distribution, at least 85% by weight in the case of a still sharper size distribution, and at least 90% by weight in the case of an especially sharp size distribution, based on the entire particles.

In fine cellulose particles of this invention which have an average particle diameter of at least 5 micrometers, the proportion of particles having a particle size in the range of the average particle diameter micrometers-±average particle (micrometers) is preferably at least 70% by weight of the entire particles.

Secondarily, the fine particles of cellulose of this invention are characterized by the following properties.

Cellulose constituting the fine cellulose particles of the invention mostly shows a degree of polymerization in the range of 100 to 700, and a copper value, measured and defined by the following method, of not more than 3. Many of the fine cellulose particles of the invention have a degree of water swelling, measured and defined by the following method, of 100 to 500%. In some of these fine cellulose particles, the volume of pores having a pore diameter, measured by the mercury porosimeter method, of 0.01 to 0.5 micrometer is not more than $60 \times 10^{-3}$ cc/g.

As stated above, the fine cellulose particles of this invention are fine and have a sharp particle size distribution, are relatively stable to chemicals and free from toxicity. Hence, they can be used in wide industrial fields as diluents for medicines, extenders for cosmetics, or as food additives.

Of course, the fine cellulose particles of this invention can be used as an aggregate of fine particles having the above characteristics (a) to (d). As required, groups of fine cellulose particles of the invention which differ from each other in average particle diameter and/or particle size distribution may be prepared, and used as a mixture.

The following examples illustrate the present invention in greater detail.

The various properties of the viscose and cellulose particles in the present invention are measured by the following methods.

Measurement Of The Crystallinity

Determined by X-ray diffractometry. An X-ray diffraction curve from $2\theta=5°$ to $2\theta=45°$ is taken, and the crystallinity is calculated in accordance with the following equation.

$$\text{Crystallinity (\%)} = \frac{C}{T'} \times 100$$

where
$T' = \{(a+C)-b\} \times K$
$C = c - a$
$K = 0.896$ (the incoherent scattering correction coefficient of cellulose),
a: the area of the diffraction curve ($2\theta=5-45°$) of amorphous starch,
b: the area of the air scattering curve ($2\theta=5-45°$),
c: the areas of the diffraction curve ($2\theta=5-45°$) of the sample Measurement Of The Particle Size Distribution About 0.1 g of a sample is put in 25 ml of pure water and dispersed with stirring. The particle size distribution of the sample is measured by a light-transmission type particle size distribution measuring instrument (SKC-2000 made by Seishin Co., Ltd.).

Measurement Of The Pore Volume Of Fine Cellulose Particles

Measured by DIGITAL READOUT POROSIMETER (Model 5-7121 mercury porosimeter made by American Instrument Co.).

The pore diameter is calculated in accordance with the following equation.

$$D = \frac{175}{P}$$

$$V = \frac{Q}{13.5585 \times S}$$

where
D is the pore diameter in micrometers, and
P is the pressure in Psia.

The pore volume at this pore diameter is calculated by using the density of mercury (13.5585 g/cm$^3$ at 15° C.).
where
V: pore volume (cc/g)
Q: the amount of mercury penetrated (cc)
S: the amount of sample (g)

Degree Of Water Swelling

About 1.0 g of fine cellulose particles are immersed in 20 times their amount of pure water and filtered spontaneously on a glass filter composed of a glass filter and a cellulose acetate film having a hole diameter of 0.2 micrometer placed in intimate contact with the glass fiber, followed by centrifugal dehydration in accordance with the method of measuring the degree of water swelling in JIS L-1015. The swollen cellulose particles are weighed (c). While the fine cellulose particles are placed on the glass filter their absolutely dried weight (d) is determined in accordance with the method of measuring the degree of water swelling in JIS L-1015. The degree of water swelling is calculated in accordance with the following equation.

$$\text{Degree of water swelling (\%)} = \frac{(c - a) - (d - b)}{(d - b)} \times 100$$

a: the weight (g) of the glass fiber and the cellulose acetate film after the centrifugal dehydration,
b: the weight (g) of the glass fiber and the cellulose acetate film in an absolutely dry condition,
c: the weight (g) of the cellulose particles, the glass filter and the cellulose acetate film after the centrifugal dehydration,
d: the weight (g) of the cellulose particles, the glass filter and the cellulose acetate film in an absolutely dry condition Average Degree Of Polymerization Measured in accordance with the method described in JIS L-1015.

Copper Value

Measured in accordance with the method described in JIS P-1801-1961.

Gamma Value

About 2.5 g of viscose is dissolved in 70 ml of pure water, and pure water is further added to adjust the total amount of the solution to 100 ml. Twenty milliliters of the viscose solution is passed through a column packed with 20 ml of an ion exchange resin (Amberlite IRA 410, OH-form) at a flow rate of 10 ml/min. Then, 20 ml of pure water is passed through the column three times and all of the waters are received in a Erlenmeyer flask. About 3 g of powdery calcium carbonate is added to the resulting liquid that has passed through the column. With stirring, 5 ml of 10% acetic acid and 5 ml of N/20 iodine are added. The mixture is back-titrated with N/20 sodium thiosulfate using a starch solution as an indicator. The gamma value is calculated in accordance with the following equation.

$$\text{Gamma value} = \frac{405.35 \times (B - A)}{C \times D}$$

where
- A: the amount (ml) of N/20 sodium thiosulfate consumed,
- B: the amount (ml) of N/20 sodium thiosulfate consumed in a blank test,
- C: the weight (g) of the viscose sample
- D: the concentration (wt.%) of cellulose in viscose Salt Point A small amount of viscose is added to an aqueous solution of sodium chloride, and the mixture is shaken. The minimum concentration of the aqueous sodium chloride solution which regenerates cellulose is determined. The salt point is calculated from the following equation.

$$\text{Salt point} = \frac{\text{Minimum concentration of the aqueous sodium chloride solution which regenerated cellulose (g/liter)}}{10}$$

Method Of Observing Fine Particles Of Viscose In The Dispersion

A small amount (less than 0.001 g) of viscose in the dispersion is collected by a very slender glass rod. Immediately then, 0.003 to 0.005 g of $2N\text{-}H_2SO_4$ is added dropwise by a slender glass rod so that it covers the collected viscose to immobilize the fine viscose particles. The fine viscose particles are photographed through a phase difference microscope (Olympus BHS) at a magnification of 400, and observed.

EXAMPLE 1

About 5 kg of pulp from a coniferous tree was immersed for 1 hour in 200 liters of a 18% by weight aqueous solution of sodium hydroxide at 20° C., and compressed to 2.8 times. The pulp was crushed for 1 hour while heating it from 25° C. to 50° C., and aged. Then, 35% by weight, based on cellulose, of carbon disulfide (1.75 kg) was added, and the cellulose was xanthated at 25° C for 1 hour. The cellulose xanthate was dissolved in an aqueous solution of sodium hydroxide to prepare viscose having a cellulose concentration of 9.5% by weight and a sodium hydroxide concentration of 5.8% by weight. The viscose had an average degree of polymerization of 320 as cellulose, a viscosity of 6,000 centipoises and a gamma value of 37.8.

Thirty grams of the viscose and 270 g of an aqueous solution of poly(sodium styrenesulfonate) (polymer concentration 21% by weight, molecular weight 500,000; tradename Ps-50, a product of Toyo Soda Co., Ltd.) as an anionic polymeric compound were put into a 500 ml flask.

While the mixture was maintained at 30° C., it was stirred for 10 minutes by a homomixer (made by Tokushu Kika Kogyo Co., Ltd.) at 4000 rpm to produce fine particles of viscose. Subsequently, with stirring, the temperature of the mixture was raised from 30° C. to 70° C. over 15 minutes, and it was maintained at for 30 minutes to coagulate the fine viscose particles. Subsequently, with stirring, the viscose particles were neutralized and regenerated with 100 g/liter of sulfuric acid to obtain a dispersion of fine particles of cellulose. The dispersion was passed through a glass filter (Model 1G4) to separate fine cellulose particles from the mother liquor. The cellulose particles were then treated with about 2 liters of a 2 g/liter aqueous solution of sodium hydroxide to remove sulfur, neutralized with a 2 g/liter aqueous solution of sulfuric acid, washed with a large excess of water and then with 50 cc of methanol, and dried at 80° C. for 3 hours to obtain fine cellulose particles.

The properties of the viscose dispersion and the cellulose particles were measured by the above methods, and the results are shown in Table 1.

TABLE 1

| Material analyzed | Item of analysis | Analysis value |
|---|---|---|
| Viscose dispersion | Shape | True sphere |
| | Maximum particle diameter (micrometers) | 20.0 |
| Cellulose particles | Crystal type | Cellulose type II |
| | Crystallinity (%) | 21.2 |
| | Shape | True sphere |
| | Average particle diameter (micrometers) | 6.64 |
| | Proportion of particles having a particle diameter in the range of the average particle diameter ±5 micrometers (% by weight) | 94 |
| | Particle size distribution | FIG. 1 |
| | Average degree of polymerization | 310 |
| | Degree of water swelling(%) | 298 |
| | Copper value | 0.7 |
| | Pore volume of particles having a pore diameter of 0.01 to 0.5 micrometers (cc/g) | $20 \times 10^{-3}$ |

EXAMPLE 2

Using a pulp from a broad-leaved tree, viscose having a cellulose concentration of 8.7% by weight, a sodium hydroxide concentration of 5.4% by weight, a viscosity of 7400 centipoises and a gamma value of 52 was prepared in the same way as in Example 1.

The viscose was subjected to dispersion, coagulation, regeneration, washing with water and drying in the same way as in Example 1 except that the amount of the viscose and the type of the anionic polymeric compound were changed as indicated in Table 2.

TABLE 2

| | Aqueous solution of the anionic polymeric compound | | | Weight of the viscose (g) | Cellulose particles | | |
|---|---|---|---|---|---|---|---|
| Run No. | Anionic polymeric compound | Molecular weight | Concentration (wt. %) | Weight (g) | | Shape | Average particle diameter (micrometers) | Portion of particles having a diameter within the average diameter ± 5 micrometers (wt. %) |

| Run No. | Anionic polymeric compound | Molecular weight | Concentration (wt. %) | Weight (g) | Weight of the viscose (g) | Shape | Average particle diameter (micrometers) | Portion of particles having a diameter within the average diameter ± 5 micrometers (wt. %) |
|---|---|---|---|---|---|---|---|---|
| 1 | Poly-(sodium styrenesulfonate) | 1,000,000 | 10 | 270 | 30 | Spherical | 8.2 | 91 |
| 2 | Poly-(sodium acrylate) | 450,000 | 5 | 270 | 30 | Spherical | 10.1 | 87 |
| 3 | Poly-(sodium methacrylate) | 700,000 | 5 | 240 | 60 | Spherical | 9.4 | 84 |

EXAMPLE 3

Viscose having a cellulose concentration of 9.3% by weight, a sodium hydroxide concentration of 5.9% by weight, a viscosity of 5,600 centipoises and a gamma value of 42 was prepared from a coniferous tree pulp as a starting material in the same way as in Example 1. Viscose particles were prepared in the same way as in Example 1 except that the molecular weight of the poly(sodium styrenesulfonate) and its concentration in the aqueous solution were changed as indicated in Table 3. The shapes of the viscose particles during dispersion and coagulation are shown in Table 3. The shape of the viscose particles during dispersion in Run No. 7 are shown in FIG. 2.

TABLE 3

| | Aqueous solution of poly(sodium styrenesulfonate) | | | Shape | |
|---|---|---|---|---|---|
| Run No. | Molecular weight | Diluting liquid | Concentration (wt. %) | during dispersion | during coagulation |
| 1 | 5,000 | 3 wt. % NaOH aqueous solution | 5 | Spherical | Spherical |
| 2 | 5,000 | 3 wt. % NaOH aqueous solution | 10 | Spherical | Spherical |
| 3 | 5,000 | 3 wt. % NaOH aqueous solution | 21 | Spherical | Spherical and elongated spherical |
| 4 | 50,000 | Water | 5 | Spherical | Spherical |
| 5 | 50,000 | Water | 10 | Spherical | Spherical |
| 6 | 50,000 | Water | 21 | Spherical | Spherical |
| 7 | 500,000 | Water | 10 | Spherical | Spherical |
| 8 | 1,000,000 | Water | 5 | Spherical | Spherical |

EXAMPLE 4

Viscose having each of the cellulose concentrations indicated in Table 4 was prepared from linter pulp as a starting material in the same way as in Example 1. The viscose was subjected to dispersion, coagulation, regeneration, washing with water and drying in the same way as in Example 1 except that the concentrations of the viscose and the aqueous solution of poly(sodium styrenesulfonate) were changed as indicated in Table 4.

The shapes of the viscose particles during dispersion and coagulation are shown in Table 4.

TABLE 4

| Run No. | Cellulose concentration of the viscose (wt. %) | Aqueous solution of poly(sodium styrenesulfonate) | | Concentration of the polymeric compound/concentration of cellulose | Shape of particles | |
|---|---|---|---|---|---|---|
| | | Diluting liquid | Concentration (wt. %) | | during dispersion | during coagulation |
| 1 | 10.1 | Water | 2 | 1.8 | Spherical | Spherical and elongated spherical |
| 2 | 10.1 | " | 5 | 4.5 | " | Spherical |
| 3 | 1.0 | 3 wt. % aqueous NaOH solution | 10 | 90 | " | Spherical and elongated spherical |
| 4 | 5.1 | Water | 10 | 18 | " | Spherical |
| 5 | 10.0 | " | 10 | 9 | " | " |
| 6 | 14.9 | " | 10 | 6 | " | " |
| 7 | 19.8 | " | 10 | 4.5 | " | " |
| 8 | 10.0 | " | 21 | 18.9 | " | " |

EXAMPLE 5

In the same way as in Example 1, viscose was prepared from a broad-leaved tree pulp as a starting material, and subjected to dispersion, coagulation, regeneration, washing with water and drying at the varying alkali concentrations of the viscose as indicated in Table 5. The shapes of the viscose particles during dispersion and coagulation are shown in Table 5.

TABLE 5

| Run No. | Composition of the viscose | | | Shape of the viscose particles | |
|---|---|---|---|---|---|
| | Alkali concentration (wt. %) | Cellulose concentration (wt. %) | Alkali/cellulose (wt. %) | during dispersion | during coagulation |
| 1 | 3.4 | 8.7 | 39.1 | Spherical | Spherical |
| 2 | 3.5 | 4.5 | 77.8 | Spherical | Spherical |
| 3 | 6.3 | 5.2 | 121.2 | Spherical | Spherical |
| 4 | 9.3 | 6.2 | 150.0 | Spherical | Spherical and elongated spherical |

EXAMPLE 6

In the same way as in Example 1, viscose having each of the average degrees of polymerization and viscosities indicated in Table 6 was prepared from linter pulp as a starting material, and subjected to dispersion, coagulation, regeneration, washing with water, and drying. The shapes of the viscose particles during dispersion and coagulation are shown in Table 6.

TABLE 6

| Run No. | Viscose | | | Shapes of viscose particles | |
|---|---|---|---|---|---|
| | Average degree of polymerization | Viscosity (cp) | Cellulose concentration (wt. %) | during dispersion | during coagulation |
| 1 | 196 | 302 | 5.8 | Spherical | Spherical |
| 2 | 260 | 513 | 6.2 | Spherical | Spherical |
| 3 | 405 | 350 | 5.2 | Spherical | Spherical |
| 4 | 621 | 892 | 5.2 | Spherical | Spherical |
| 5 | 209 | 300 | 6.6 | Spherical | Spherical |
| 6 | 209 | 1500 | 10.0 | Spherical | Spherical |
| 7 | 209 | 10300 | 13.3 | Spherical | Spherical and elongated spherical |

EXAMPLE 7

Thirty grams of the viscose prepared in Example 1 and 270 g of an aqueous solution of poly(sodium styrenesulfonate) (molecular weight 500,000; polymer concentration 21% by weight) were put into a 500 ml beaker and the temperature of the mixture was adjusted to 30° C. The mixture was put in a stationary mixing agitator constructed by connecting 18 static mixer elements (made by Kenics Company) alternately to right and left and at right angles, and divided into 262144 layers and mixed. In the resulting mixed solution, viscose dispersed in spherical particles having a maximum particle diameter of 21 micrometers.

EXAMPLE 8

Thirty grams of the same viscose as obtained in Example 1 and 270 g of poly(sodium styrenesulfonate) (molecular weight 500,000; polymer concentration 21% by weight) were put into 500 ml flask. While the temperature of the mixture was maintained at 30° C., the mixture was stirred at 4000 rpm for 10 minutes and subjected to the coagulating conditions shown in Table 7. The same work-up as in Example 1 was carried out to obtain particles. The shapes of the viscose particles during dispersion and coagulation are shown in Table 7.

Figure 3:
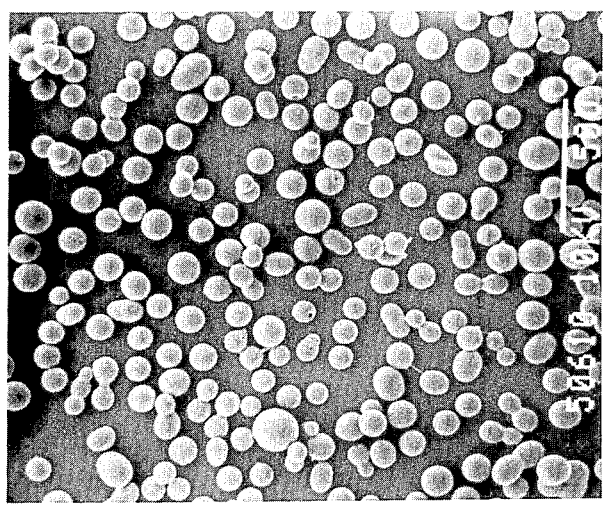
FIGS. 3 and 4 are micrographs taken at different magnifications of cellulose particles obtained in accordance with the first process of the invention.
Figure 4:
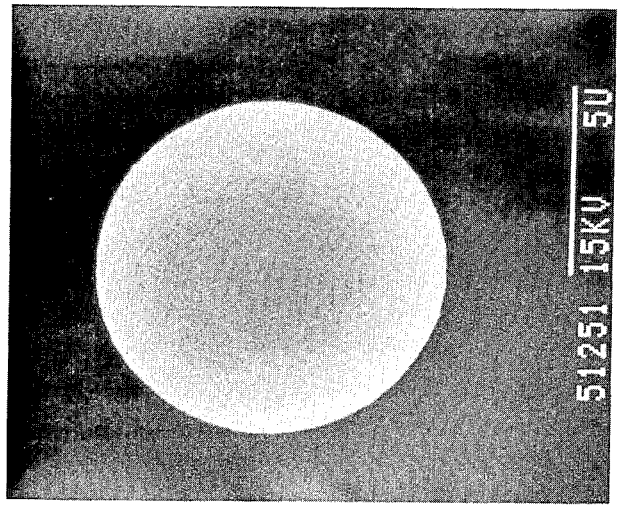
Figure 5:
FIGS. 5 and 6 are micrographs at different magnifications of other cellulose particles obtained in accordance with the first process of the invention.
Figure 6:
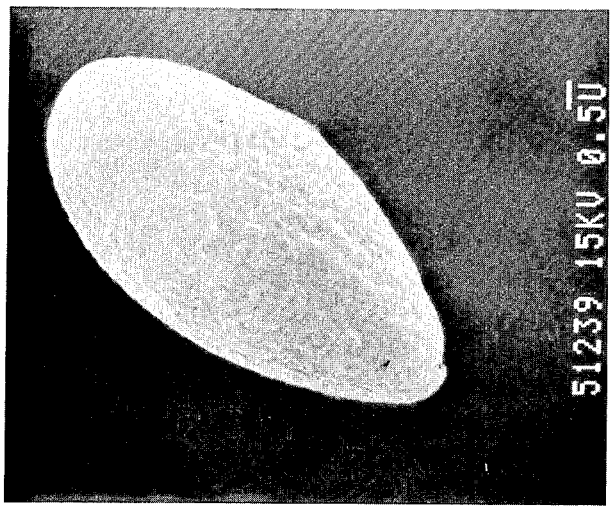

Electron micrographs of the cellulose particles obtained in Run No. 2 are shown in FIGS. 3 and 4, and electron micrographs of the cellulose particles obtained in Run No. 3, in FIGS. 5 and 6.

TABLE 7

| Run No. | Coagulating conditions | | | | Shapes of the viscose particles | |
|---|---|---|---|---|---|---|
| | Stirring (rpm) | Temperature elevating conditions | | Coagulation with salt | during dispersion | during coagulation |
| | | Temperature (°C.) | Time (min.) | | | |
| 1 | No | 30 → 70 | 15 | — | Spherical | Aggregate |
| 2 | Yes (4000) | 30 → 70 | 15 | — | " | Spherical |
| 3 | Yes (7000) | 30 → 70 | 15 | — | " | Elongated spherical |
| 4 | Yes (4000) | 30 → 90 | 30 | — | " | Spherical |
| 5 | Yes (4000) | 30 | 60 | Aqueous NaCl solution (50 g/l) was added in 6 portions | " | " |

Run No. 1 was for comparison, and
Run Nos. 2 to 5 were within the present invention.

EXAMPLE 9

Thirty grams of the same viscose as obtained in Example 1 and 270 g of poly(sodium styrenesulfonate) (molecular weight 500,000; polymer concentration 21% by weight) were put into a 500 ml flask. As indicated in Table 8, the mixture was stirred at 4000 rpm by a homomixer under the dispersing conditions shown in Table 8. The shape of the viscose particles during dispersion is shown in Table 8.

TABLE 8

| Run No. | Dispersing conditions | | Shape during dispersion |
|---|---|---|---|
| | Temperature (°C.) | Time (min.) | |
| 1 | 0 | 10 | Spherical |
| 2 | 10 | 0.5 | Spherical |
| 3 | 10 | 1 | Spherical |
| 4 | 10 | 10 | Spherical |
| 5 | 10 | 30 | Spherical |
| 6 | 20 | 0.5 | Spherical |
| 7 | 30 | 0.5 | Spherical |
| 8 | 40 | 0.5 | Spherical |

EXAMPLE 10

Viscoses having a gamma value of 32 (salt point 3.7), 45 (salt point 6.1), 82 salt point 17.3), and 93 (salt point 20.2) were prepared from a broad-leaved tree as a starting material. Cellulose particles were prepared under the same conditions as in Example 1 using the resulting viscoses and poly(sodium styrenesulfonate) (molecular weight 500,000; polymer concentration 21% by weight). All of these cellulose particles were spherical.

EXAMPLE 11

Thirty grams of the viscose obtained in Example 1 and 270 g of an aqueous solution of poly(sodium styrene-sulfonate) (molecular weight 500,000; polymer solution 21 % by weight) were put in a 500 ml flask, and agitated for 3 minutes at 4000 rpm by a homomixer while the temperature of the mixture was maintained at 30° C. The resulting dispersion was subjected to simultaneously coagulation and regeneration by stirring it while 200 g of a mixture of 1N $H_2SO_4$ and the above aqueous solution of poly(sodium styrenesulfonate) in a weight ratio of 1:1 was added dropwise over 30 minutes. The resulting cellulose particles were spherical and had an average particle diameter of 11.3 micrometers.

EXAMPLES 12

Thirty grams of the viscose obtained in Example 1 was dissolved in 265 g of pure water. The diluted viscose was put into a 500 ml flask and while it was stirred by a homomixer at 4000 rpm at 30° C., 5 g of flakes of poly(sodium acrylate) having a molecular weight of 2,000,000 were added. The mixture was stirred for 30 minutes, and the temperature of the mixture was elevated from 30° to 70° C. over 15 minutes to coagulate and regenerate the fine viscose particles, followed by washing with water and drying. The resulting cellulose particles were spherical and had an average particle diameter of 14.3 micrometers.

EXAMPLE 13

A water-soluble copolymer of methyl acrylate and sodium acrylate with each of the sodium acrylate contents indicated in Table 9 was prepared. Then, 270 g of a 15 % aqueous solution of the copolymer was kept at 20° C. and stirred at 4000 rpm, and 30 g of the viscose obtained in Example 1 was added. The mixture was stirred for 5 minutes. The state of dispersion of the viscose in the mixture was observed by the photographic method described hereinabove. The results are shown in Table 9.

TABLE 9

| Run No. | Content of sodium acrylate in the water-soluble copolymer (mole %) | Shape during dispersion |
|---|---|---|
| 1 | 100 | Spherical |
| 2 | 70 | Spherical |
| 3 | 40 | Spherical |
| 4 | 20 | Spherical and elongated spherical |

COMPARATIVE EXAMPLE 1

In the same way as in Example 1, viscose having a cellulose concentration of 9.0 % by weight, a sodium hydroxide concentration of 5.7 %, a viscosity of 5900 centipoises and a gamma value of 43 was prepared from a coniferous tree pulp. Three hundred milliliters of liquid paraffin (a product of Wako Pure Chemicals, Co., Ltd.; viscosity at 20° C. 170–180 centipoises) was put in a 500 ml flask, and at 30° C. under the stirring conditions shown in Table 10, 33 g of the viscose was added. The mixture was stirred further for 20 minutes to disperse the viscose. With stirring, the temperature of the dispersion was elevated from 30° to 80° C. over 20 minutes, and the mixture was maintained at 80° C. for 1.5 hours to form viscose particles. The viscose particles were washed with xylene, methanol and warm water. The viscose particles were dispersed in 200 ml of an aqueous solution of sulfuric acid (49 g/liter) and the dispersion was stirred for 1 hour to effect neutralization and regeneration and obtain a dispersion of cellulose particles. The dispersion was worked up in the same way as in Example 1 to obtain cellulose particles.

The resulting cellulose particles were observed under a microscope, and the results are shown in Table 10. The average particle diameters indicated in Table 10 were obtained from 100 cellulose particles. Under any of the conditions, cellulose particles having an average particle diameter of not more than 20 microns could be obtained.

TABLE 10

| Run No. | Stirrer | Rotating speed (rpm) | Average particle diameter (micrometers) | Maximum particle diameter (micrometers) | Minimum particle diameter (micrometers) |
|---|---|---|---|---|---|
| 1 | Three-one motor made by Heidon Comp. Ltd. | 600 | 1,070 | 1,530 | 320 |
| 2 | Three-one motor made by Heidon Comp. Ltd. | 800 | 425 | 580 | 85 |
| 3 | Three-one motor made by Heidon Comp. Ltd. | 1,000 | 285 | 380 | 34 |
| 4 | Homomixer (made by Tokushu Kika Kogyo Co., Ltd.) | 7,000 | 48 | 75 | 13 |

EXAMPLE 14

About 5 kg of pulp from a coniferous tree was immersed for 1 hour in 200 liters of a 18% by weight aqueous solution of sodium hydroxide and compressed to 2.8 times. It was crushed for 1 hour while its temperature was raised from 25° to 50° C., and aged. Then, 35% by weight, based on the cellulose, of carbon disulfide (1.75 kg) was added and the cellulose was xanthated at 25° C. for 1 hour to form cellulose xanthate. The xanthate was dissolved in an aqueous solution of sodium hydroxide to prepare viscose having a cellulose concentration of 8.7% by weight, and a sodium hydroxide concentration of 5.6% by weight. The viscose had an average degree of polymerization of 280 as cellulose, a gamma value of 36.5 and a viscosity of 6800 centipoises.

Thirty grams of the viscose and 270 g of an aqueous solution of poly(sodium acrylate) (molecular weight 40,000; polymer concentration 7% by weight) were put into a 500 ml flask. The mixture was stirred by a labostirrer (Model LR-51B, made by Yamato Science Co., Ltd.; rotating vanes 7 cm) for 10 minutes at 30° C. to form fine viscose particles. Subsequently, the temperature of the dispersion was elevated from 30° to 80° C. over 15 minutes with stirring, and it was maintained at 80° C. for 30 minutes to coagulate the fine viscose particles. Subsequently, with stirring, the fine viscose particles were neutralized and regenerated with sulfuric acid (100 g/liter) to obtain a dispersion of fine cellulose particles. The dispersion was passed through a glass filter (1G4 type) to separate the cellulose particles from the mother liquor. The fine cellulose particles were treated with about 2 liters of 2 g/liter aqueous solution of sodium hydroxide at 50° C. to remove sulfur, neutralized with a 2 g/liter aqueous solution of sulfuric acid, washed with a large excess of water and then with 50 cc of methanol, and dried at 80° C. for 3 hours to form fine cellulose particles.

The properties of the fine cellulose particles obtained were measured, and the results are shown in Table 11.

TABLE 11

| Crystal type | Cellulose II-type |
|---|---|
| Crystallinity | 28 (%) |
| Shape | True sphere |
| Average particle diameter | 75 micrometers |
| Average degree of polymerization | 265 |
| Degree of water swelling | 273% |
| Copper value | 0.4 |

EXAMPLE 15

Cellulose particles obtained under the same conditions as in Example 14 using viscoses from a broad-leaved tree pulp having a gamma value of 30 (salt point 3.4), 42 (salt point 5.8), 80 (salt point 17.0), and 93 (salt point 20.5) and poly(sodium acrylate) (molecular weight 40,000; polymer concentration 7% by weight) were spherical and had an average particle diameter of 50, 61, 75, and 80 micrometers, respectively.

EXAMPLE 16

Cellulose particles prepared under the same conditions as in Example 14 using viscoses prepared from a broad-leaved tree pulp and having a cellulose concentration of 8.0% by weight and an alkali concentration of 3.5, 5.4, 6.5, and 11.2% by weight, respectively, were spherical and had an average particle diameter of 51, 59, 63 and 77 micrometers, respectively.

EXAMPLE 17

Cellulose particles obtained under the same conditions as in Example 14 using viscoses having the average degrees of polymerization as cellulose and viscosities indicated in Table 12 and prepared from linter pulp were all spherical, and had the average particle diameters indicated in Table 12.

TABLE 12

| Run No. | Viscose | | | Average diameter of the spherical particles (micrometers) |
|---|---|---|---|---|
| | Average degree of polymerization | Viscosity (cp) | Cellulose concentration (%) | |
| 1 | 201 | 920 | 7.3 | 71 |
| 2 | 405 | 2300 | 9.0 | 75 |
| 3 | 520 | 3100 | 7.0 | 72 |
| 4 | 653 | 900 | 5.2 | 78 |
| 5 | 280 | 300 | 4.1 | 70 |
| 6 | 280 | 1200 | 9.3 | 72 |
| 7 | 280 | 9300 | 13.8 | 77 |

TABLE 12-continued

EXAMPLE 18

Example 14 was repeated except that each of the aqueous solutions of anionic polymeric compounds indicated in Table 13 was used instead of the aqueous solution of poly(sodium acrylate). The shapes and average particle diameters of the fine cellulose particles are shown in Table 13.

TABLE 13

| Run No. | Aqueous solution of an anionic polymeric compound | | | Cellulose particles | |
|---|---|---|---|---|---|
| | Polymeric compound | Molecular weight | Concentration (wt. %) | Shape | Average particle diameter (micrometers) |
| 1 | Poly(sodium acrylate) | 40,000 | 5 | Spherical | 102 |
| 2 | poly(sodium methacrylate) | 50,000 | 7 | Spherical | 65 |
| 3 | Poly(sodium styrenesulfonate) | 50,000 | 14 | Spherical | 81 |

EXAMPLE 19

Example 14 was repeated except that the molecular weight and concentration of poly(sodium acrylate) were changed as indicated in Table 14. The shapes and average particle diameters of the resulting cellulose particles are shown in Table 14.

TABLE 14

| Run No. | Aqueous solution of poly(sodium acrylate) | | Cellulose particles | |
|---|---|---|---|---|
| | Molecular weight | Concentration (wt. %) | Shape | Average particle diameter (micrometers) |
| 1 | 40,000 | 7 | Spherical | 75 |
| 2 | 100,000 | 5 | Spherical | 50 |
| 3 | 400,000 | 5 | Spherical | 42 |
| 4 | 700,000 | 5 | Spherical | 20 |

EXAMPLE 20

Cellulose particles were obtained by repeating Example 14 except that poly(sodium acrylate) having a molecular weight of 40,000 and a concentration of 10% by weight was used, and the rotating speed of the labostirrer was changed to 200, 400, and 800 rpm, respectively. The shapes and average particle diameters of the resulting cellulose particles are shown in Table 15.

TABLE 15

| Run No. | Rotating speed (rpm) | Peripheral speed (m/min.) | Shape | Average particle diameter (micrometers) |
|---|---|---|---|---|
| 1 | 200 | 44 | Spherical | 153 |
| 2 | 400 | 88 | Spherical | 63 |
| 3 | 800 | 176 | Spherical | 25 |

EXAMPLE 21

Viscose having each of the cellulose concentrations shown in Table 16 was prepared by the same method as in Example 14. Fine particles of the viscose were prepared under the same conditions as in Example 14 except that the concentrations of the viscose and the aqueous solution of poly(sodium acrylate) (molecular weight 40,000) were changed as shown in Table 16. The viscose particles were subjected to coagulation, regeneration, washing with water and drying. The resulting cellulose particles were spherical.

TABLE 16

| Run No. | Cellulose concentration of viscose (wt. %) | Concentration of poly(sodium acrylate) (wt. %) | Concentration of poly(sodium acrylate)/cellulose concentration | Average particle diameter of the spherical cellulose particles (micrometers) |
|---|---|---|---|---|
| 1 | 10.1 | 12 | 13.4 | 152 |
| 2 | 5.1 | 12 | 21.2 | 141 |
| 3 | 10.1 | 7 | 6.3 | 78 |
| 4 | 14.9 | 7 | 4.2 | 73 |
| 5 | 19.8 | 7 | 3.2 | 65 |

EXAMPLE 22

Fine cellulose particles were prepared in the same way as in Example 14 except that an aqueous solution of poly(sodium styrenesulfonate) (molecular weight 500,000; polymer concentration 14% by weight) containing 0.04 g of poly(N,N-dimethyl-3,5-methylene-piperizium chloride) (molecular weight 75,000) was used instead of the aqueous solution of poly(sodium acrylate). The results are shown in Table 17.

TABLE 17

| | |
|---|---|
| Crystal type | Cellulose II-type |
| Crystallinity | 29 (%) |
| Shape | True sphere |
| Average particle diameter | 10.2 micrometers |
| Average degree of polymerization | 270 |
| Degree of water swelling | 231% |
| Copper value | 0.4 |

EXAMPLE 23

Cellulose particles obtained under the same conditions as in Example 22 using viscoses having a gamma value of 30 (salt point 3.4), 42 (salt point 5.8), 80 (salt point 17.0), and 93 (salt point 20.5), respectively, and prepared from a broad-leaved tree pulp as a starting material and an aqueous solution of poly(sodium styrenesulfonate) (molecular weight 1,000,000; polymer concentration 14% by weight) containing 0.04 g of poly(N,N-dimethyl-3,5-methylene-piperizium chloride) were spherical and had an average particle diameter of 8.0, 8.5, 9.8, and 10.5 micrometers.

EXAMPLE 24

Cellulose particles obtained under the same conditions as in Example 22 using viscoses having a cellulose concentration of 8.0% by weight and an alkali concentration of 3.5, 5.4, 6.5, and 11.2% by weight and prepared from a broad-leaved tree pulp were spherical and had an average particle diameter of 9.5, 10.2, 11.0, and 12.2 micrometers, respectively.

EXAMPLE 25

Example 22 was repeated except that each of viscoses prepared from linter pulp and having the properties indicated in Table 18 was used as the viscose. The average particle diameters of the resulting cellulose particles which were all spherical are shown in Table 18.

TABLE 18

| | Viscose | | | Average diameter of the spherical particles (micrometers) |
|---|---|---|---|---|
| Run No. | Average degree of polymerization | Viscosity (cp) | Cellulose concentration (%) | |
| 1 | 201 | 920 | 7.3 | 10.2 |
| 2 | 405 | 2300 | 9.0 | 10.6 |
| 3 | 520 | 3100 | 7.0 | 9.3 |
| 4 | 653 | 900 | 5.2 | 8.8 |
| 5 | 280 | 300 | 4.1 | 10.1 |
| 6 | 280 | 1200 | 9.3 | 10.5 |
| 7 | 280 | 9300 | 13.8 | 11.0 |

EXAMPLE 26

Example 14 was repeated except that an aqueous solution of each of the anionic polymeric compounds shown in Table 19 containing 0.04 g of poly(N,N-dimethyl-3,5-methylene-piperizium chloride) (molecular weight 75,000) was used instead of the aqueous solution of poly(sodium acrylate). The shapes and average particle diameters of the resulting cellulose particles are shown in Table 19.

TABLE 19

| | Aqueous solution of an anionic polmeric compound | | | Cellulose particles | |
|---|---|---|---|---|---|
| Run No. | Anionic polymeric compound | Molecular weight | Concentration (wt. %) | Shape | Average particle diameter (micrometers) |
| 1 | Poly(sodium acrylate) | 80,000 | 5 | Spherical | 15.8 |
| 2 | poly(sodium methacrylate) | 50,000 | 7 | Spherical | 14.3 |
| 3 | Poly(sodium styrene- | 500,000 | 17 | Spherical | 9.4 |

TABLE 19-continued

| | Aqueous solution of an anionic polmeric compound | | | Cellulose particles | |
|---|---|---|---|---|---|
| Run No. | Anionic polymeric compound | Molecular weight | Concentration (wt. %) | Shape | Average particle diameter (micrometers) |
| | sulfonate | | | | |

EXAMPLE 27

Example 22 was repeated except that the molecular weight and concentration of poly(sodium styrenesulfonate) were changed as indicated in Table 20. The shapes and average particle diameters of the resulting cellulose particles are shown in Table 20.

TABLE 20

| | Aqueous solution of poly(sodium styrenesulfonate) | | Cellulose particles | |
|---|---|---|---|---|
| Run No. | Molecular weight | Concentration (wt. %) | Shape | Average particle diameter (micrometers) |
| 1 | 500,000 | 10 | Spherical | 8.5 |
| 2 | 500,000 | 17 | Spherical | 10.5 |
| 3 | 1,000,000 | 10 | Spherical | 8.0 |
| 4 | 1,000,000 | 17 | Spherical | 9.8 |

EXAMPLE 28

Example 22 was repeated except that poly(sodium styrenesulfonate) having a molecular weight of 1,000,000 was used in a concentration of 14% by weight as the anionic polymeric compound, and the stirring by the labostirrer was carried out at a rotating speed of 200, 400, and 800 rpm, respectively. The shapes and average particle diameters of the resulting cellulose particles are shown in Table 21.

TABLE 21

| Run No. | Rotating speed (rpm) | Peripheral speed (m/min.) | Shape | Average particle diameter (micrometers) |
|---|---|---|---|---|
| 1 | 200 | 44 | Spherical | 14.0 |
| 2 | 400 | 88 | Spherical | 8.5 |
| 3 | 800 | 176 | Spherical | 5.2 |

EXAMPLE 29

Example 22 was repeated except that each of the cationic polymeric compounds indicated in Table 22 was used instead of the cationic polymeric compound used in Example 22. The average particle diameters of the resulting cellulose particles are shown in Table 22.

TABLE 22

| Run No. | Cationic polymeric compound | Molecular weight | Average particle diameter (micrometers) |
|---|---|---|---|
| 1 | Poly(N,N—dimethyl-3,5-methylenepiperizuium chloride) | 9,000 | 10.2 |
| 2 | Poly(methacryloxyethyl ammonium chloride) | 28,000 | 12.5 |
| 3 | Poly(vinylbenzyl trimethyl ammonium chloride) | 3,000 | 9.1 |

TABLE 22-continued

| Run No. | Cationic polymeric compound | Molecular weight | Average particle diameter (micrometers) |
|---|---|---|---|
| | ammonium chloride) | | |

EXAMPLE 30

Figure 7:
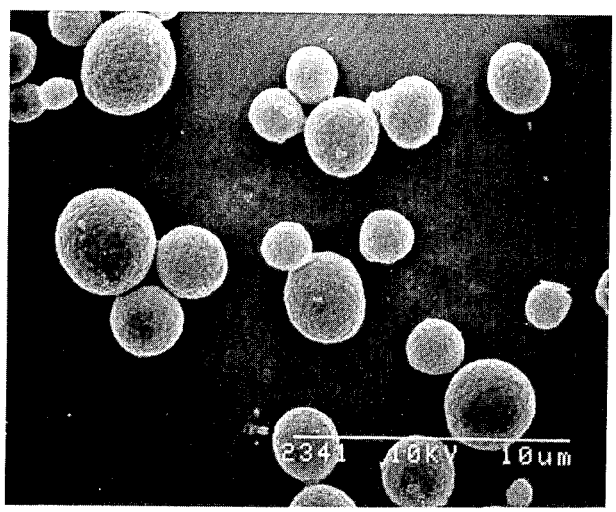
FIGS. 7 and 8 are micrographs taken at different magnifications of cellulose particles obtained in accordance with a preferred embodiment of the first process of the invention.
Figure 8:
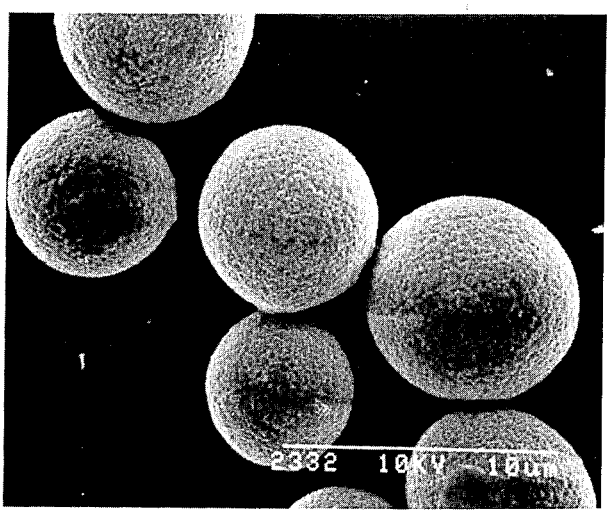

Example 22 was repeated except that poly(N,N-dimethyl-3,5-methylenepiperizium chloride) having a molecular weight of 9,000 was used as the cationic polymeric compound in each of the amounts indicated in Table 23. The average particle diameters of the resulting cellulose particles are shown in Table 23. Electron micrographs of the resulting cellulose particles are shown in FIGS. 7 and 8.

TABLE 23

| Run No. | Amount of the cationic polymeric compound (parts by weight per part by weight of poly(sodium styrenesulfonate)) | Average particle diameter (micrometers) |
|---|---|---|
| 1 | 0.005 | 16.3 |
| 2 | 0.01 | 10.6 |
| 3 | 0.05 | 8.0 |
| 4 | 0.1 | 5.1 |
| 5 | 0.3 | 3.3 |

EXAMPLE 31

About 5 kg of pulp from a coniferous tree was immersed for 1 hour in 200 liters of an 18% by weight aqueous solution of sodium hydroxide, and compressed to 2.8 times. It was crushed for 1 hour while its temperature was raised from 25° to 50° C., and aged. Then, 35% by weight, based on cellulose, of carbon disulfide (1.75 kg) was added and the cellulose was xanthated at 25° C. for 1 hour. The resulting cellulose xanthate was dissolved in an aqueous solution of sodium hydroxide to form a viscose having a cellulose concentration of 9.0% by weight and a sodium hydroxide concentration of 5.5% by weight. The viscose had an average degree of polymerization of 304 as cellulose, a viscosity of 7,200 centipoises and a gamma value of 37.0.

Figure 9:
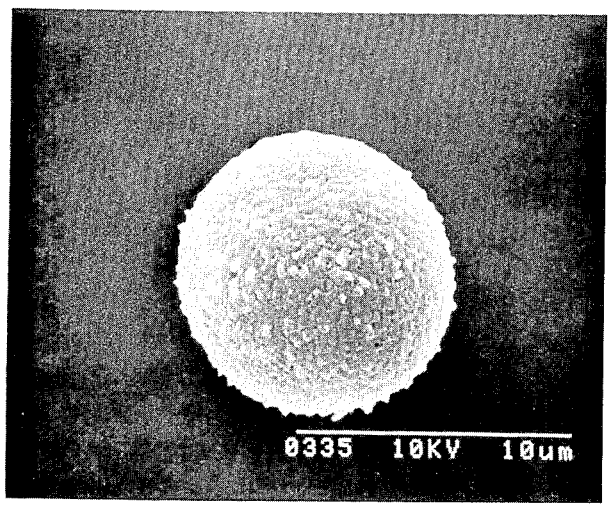
FIG. 9 is a micrograph of cellulose particles obtained by the second process of this invention.

Sixty grams of the viscose and 240 g of an aqueous solution of polyethylene glycol (molecular weight 20,000; polymer concentration 30% by weight) were put into a 500 ml flask. The mixture was stirred for 10 minutes at 40° C. by a labostirrer (Model LR-51B made by Yamato Science Co., Ltd.) at 1000 rpm. Subsequently, with stirring, the temperature of the mixture was raised from 40° to 80° C. over 15 minutes to form a dispersion of viscose. The dispersion was then maintained at 80° C. for 30 minutes to coagulate the fine viscose particles. Subsequently, the fine viscose particles were neutralized and regenerated with sulfuric acid (100 g/liter) with stirring to obtain a dispersion of fine cellulose particles. The dispersion was passed through a glass filter (IG4-type) to separate the fine cellulose particles form the mother liquor. The fine cellulose particles were treated with about 2 liters of an aqueous solution of sodium hydroxide (2 g/liter) to remove sulfur, neutralized with an aqueous solution of sulfuric acid (2 g/liter), washed with a large excess of water and then with 50 cc of methanol, and dried at 80° C. for 3 hours to obtain fine cellulose particles. The properties of the cellulose particles measured by the methods described hereinabove are shown in Table 24. An electron micrograph of the resulting cellulose particles is shown in FIG. 9.

TABLE 24

| Crystal type | Cellulose II-type |
|---|---|
| Crystallinity | 25 (%) |
| Shape | True sphere |
| Average particle diameter | 9.3 micrometers |
| Average degree of polymerization | 280 |
| Degree of water swelling | 217% |
| Copper value | 0.5 |

EXAMPLE 32

Cellulose particles obtained under the same conditions as in Example 31 using viscoses prepared from a broad-leaved pulp and having a gamma value of 32 (salt point 3.7), 45 (salt point 6.1), 82 (salt point 17.3), and 93 (salt point 20.2) and polyethylene glycol (molecular weight 20,000; polymer concentration 30% by weight) were all spherical.

EXAMPLE 33

Example 31 was repeated except that each of the viscoses shown in Table 25 was used. The viscose particles were spherical during coagulation.

TABLE 25

| | Viscose composition | | |
|---|---|---|---|
| Run No. | Alkali concentration (wt. %) | Cellulose concentration (wt. %) | Alkali cellulose (wt. %) |
| 1 | 3.4 | 8.7 | 40.2 |
| 2 | 5.5 | 10.3 | 51.5 |
| 3 | 6.3 | 9.0 | 70.0 |
| 4 | 12.5 | 13.9 | 89.9 |

EXAMPLE 34

Example 31 was repeated except that each of the viscoses shown in Table 26 prepared from linter pulp was used. At the time of coagulation, the viscose particles were spherical in all runs.

TABLE 26

| | Viscose | | |
|---|---|---|---|
| Run No. | Average degree of polymerization | Viscosity (cp) | Cellulose concentration (wt. %) |
| 1 | 196 | 302 | 5.8 |
| 2 | 260 | 513 | 6.2 |
| 3 | 405 | 350 | 5.2 |
| 4 | 621 | 892 | 5.2 |
| 5 | 209 | 300 | 6.6 |
| 6 | 209 | 1500 | 10.0 |
| 7 | 209 | 10300 | 13.3 |

EXAMPLE 35

Viscose having a cellulose concentration of 8.7% by weight, a sodium hydroxide concentration of 5.4% by weight, a viscosity of 7400 centipoises and a gamma value of 52 was prepared from a broad-leaved tree pulp as a starting material in the same way as in Example 31.

The viscose was subjected to dispersion, coagulation, regeneration, washing with water and drying in the same way as in Example 31 except that the amount of the viscose was changed as shown in Table 27, and each of polyethylene glycol (POE) or its derivatives shown in Table 27 was used. The shapes and average particle diameters of the resulting fine cellulose particles are shown in Table 27.

TABLE 27

| | Aqueous solution of POE or its derivative | | | Weight of the viscose (g) | Cellulose particles | |
|---|---|---|---|---|---|---|
| Run No. | POE or its derivative | Molecular weight | Concentration (wt. %) | Weight (g) | Shape | Average particle diameter (micrometers) |
| 1 | Polyethylene glycol | 6,000 | 50 | 240 | 60 | Spherical | 65 |
| 2 | POE (50) lauryl ether | 2,500 | 30 | 240 | 60 | Spherical | 41 |
| 3 | POE (40) nonylphenyl ether | 1,900 | 30 | 240 | 60 | Spherical | 53 |
| 4 | Polypropylene glycol ethylene oxide block copolymer | 4,000 | 40 | 240 | 60 | Spherical | 11 |

EXAMPLE 36

Viscose having a cellulose concentration of 9.3% by weight, a sodium hydroxide concentration of 5.9% by weight, a viscosity of 600 centipoises and a gamma value of 42 was prepared from a coniferous tree pulp as a starting material in the same way as in Example 31. From the viscose, viscose particles were prepared in the same way as in Example 31 except that each of the aqueous solution of polyethylene glycol indicated in Table 28 was used. The shape of the viscose particles during coagulation was spherical in all runs.

TABLE 28

| | Aqueous solution of polyethylene glycol | |
|---|---|---|
| Run No. | Molecular weight | Concentration (wt. %) |
| 1 | 2,000 | 40 |
| 2 | 6,000 | 40 |
| 3 | 20,000 | 30 |
| 4 | 100,000 | 5 |
| 5 | 350,000 | 2 |

EXAMPLE 37

Viscose having each of the cellulose concentrations indicated in Table 29 was prepared from linter pulp in the same way as in Example 31. The viscose was subjected to dispersion, coagulation, regeneration, washing with water, and drying in the same way as in Example 31 except that an aqueous solution of polyethylene glycol (molecular weight 20,000) in each of the concentrations shown in Table 29 was used.

At the time of coagulation, the viscose particles were spherical in all runs.

TABLE 29

| Run No. | Cellulose concentration in the viscose (wt. %) | Concentration of polyethylene glycol in the aqueous solution (wt. %) | Concentration of polyethylene glycol/ concentration of cellulose |
|---|---|---|---|
| 1 | 10.0 | 20 | 7.9 |
| 2 | 10.1 | 50 | 19.8 |
| 3 | 6.0 | 40 | 26.7 |
| 4 | 5.1 | 30 | 23.5 |
| 5 | 10.0 | 30 | 12 |
| 6 | 14.9 | 30 | 8.1 |

EXAMPLE 38

Sixty grams of the viscose obtained in Example 31 was dissolved in 180 g of pure water. The diluted viscose was put in a 300 ml flask, and while the solution was stirred at 1000 rpm by a labostirrer at a solution temperature of 40° C., 60 g of flakes of polyethylene glycol having a molecular weight of 20,000 were added. The mixture was stirred for 30 minutes, and then the temperature of the mixture was raised from 40° to 80° C. over 15 minutes to form a dispersion of the viscose. The fine viscose particles were coagulated and regenerated, followed by washing with water and drying to form cellulose particles. The resulting cellulose particles were spherical and had an average particle diameter of 12.5 micrometers.

EXAMPLE 39

Sixty grams of the viscose (about 20° C.) prepared in Example 1 was put into 240 g of an aqueous solution of polyethylene glycol (molecular weight 20,000; concentration 30% by weight) heated to 80° C. The mixture was heated for 30 minutes with stirring at 1000 rpm by a labostirrer. The resulting fine viscose particles were spherical and had an average particle diameter of 11.3 micrometers.

EXAMPLE 40

Sixty grams of the viscose prepared in Example 1 was put into 240 g of an aqueous solution of polyethylene glycol (molecular weight 20,000; concentration 30% by weight). The mixture was then stirred at 1000 rpm for 10 minutes at 40° C. by a labostirrer. The temperature of the mixture was then raised from 40° to 60° C. over about 10 minutes to prepare true spherical fine particles of viscose. At this time, an aqueous solution of ethylene glycol (molecular weight 20,000; concentration 30% by weight) containing 5 g/liter of sulfuric acid was heated to 60° C., and put into the dispersion of the viscose particles. Subsequently, the mixture was heated for 30 minutes to obtain coagulated fine viscose particles. The resulting viscose particles had an average diameter of 9.8 micrometers, and a smooth surface.

What is claimed is:

1. A process for producing fine cellulose particles, which comprises
   (1) mixing viscose with a water-soluble anionic polymeric compound and forming a dispersion of fine droplets of the viscose dispersed in an aqueous mother liquor,
   (2) (i) heating the dispersion without drying it or mixing it with a coagulating agent to thereby coagulate the viscose in the dispersion, and thereafter neutralizing the dispersion with an acid to form fine particles of cellulose dispersed in said aqueous mother liquor, or (ii) coagulating and neutralizing the dispersion with an acid to form fine particles of cellulose dispersed in said aqueous mother liquor, and
   (3) thereafter, separating the fine particles of cellulose from said aqueous mother liquor.

2. The process of claim 1 wherein the viscose has a cellulose concentration of 3 to 15% by weight.

3. The process of claim 1 wherein the viscose has an alkali concentration, calculated as sodium hydroxide, of 2 to 15% by weight.

4. The process of claim 1 wherein the proportion of alkali calculated as sodium hydroxide, is 40 to 100% by weight, based on the cellulose of the viscose.

5. The process of claim 1 wherein the viscose has a gamma value of 30 to 100.

6. The process of claim 1 wherein the viscose has a viscosity at 20° C. of 50 to 20,000 centipoises.

7. The process of claim 1 wherein the viscose has a salt point of 3 to 20.

8. The process of claim 1 wherein the water-soluble anionic polymeric compound has a sulfonic acid group, a phosphonic acid group or a carboxylic acid group in the form of a free acid or a salt thereof as an anionic group.

9. The process of claim 1 wherein the water-soluble anionic polymeric compound has units derived from at least one monomer selected from the group consisting of vinylsulfonic acid, styrenesulfonic acid, methylstyrenesulfonic acid, allylsulfonic acid, methallylsulfonic acid, acrylamidomethylpropanesulfonic acid, and salts of said acids.

10. The process of claim 1 wherein the water-soluble anionic polymeric compound has units derived from at least one monomer selected from the group consisting of acrylic acid, methacrylic acid, styrenecarboxylic acid, maleic acid, itaconic acid and salts of said acids.

11. The process of claim 1 wherein the water-soluble anionic polymeric compound has units derived from at least one monomer selected from the group consisting of styrenephosphonic acid, vinylphosphonic acid and salts of said acids.

12. The process of claim 1 wherein the water-soluble anionic polymeric compound is a homopolymer or copolymer containing at least 20 mole % of the monomeric units selected from the group consisting of vinylsulfonic acid, styrenesulfonic acid, methylstyrenesulfonic acid, allylsulfonic acid, methallylsulfonic acid, acrylamidomthylpropanesulfonic acid, and salts of said acids.

13. The process of claim 1 wherein the water-soluble anionic polymeric compound has a number average molecular weight of at least 5,000.

14. The process of claim 1 wherein in said mixing step (1), an aqueous solution containing 0.5–25 % by weight of said water-soluble anionic polymeric compound is mixed with said viscose.

15. The process of claim 1 wherein in said mixing step (1), an aqueous solution of said water-soluble animonic polymeric compound, having a viscosity at 20° C. of 30,000 to 50,000 centipoises, is mixed with said viscose.

16. The process of claim 1 wherein the viscose and the water-soluble anionic polymeric compound are mixed at a temperature lower than the boiling point of carbon disulfide.

17. The process of claim 1 wherein the viscose and the water-soluble anionic polymeric compound are mixed by mechanical stirring.

18. The process of claim 1 wherein the viscose and the water-soluble anionic polymeric compound are mixed in such proportions that 0.3 to 100 parts by weight of the water-soluble anionic polymeric compound is used per one part by weight of cellulose.

19. The process of claim 1 wherein the dispersion of fine droplets in step (1) is formed by mixing the viscose with the water-soluble anionic polymeric compound and a cationic polymeric compound.

20. The process of claim 19 wherein the cationic polymeric compound is water-soluble.

21. The process of claim 19 wherein the cationic polymeric compound is a quaternary ammonium salt.

22. The process of claim 19 wherein the cationic polymeric compound is an ammonium salt represented by the following formula (I)

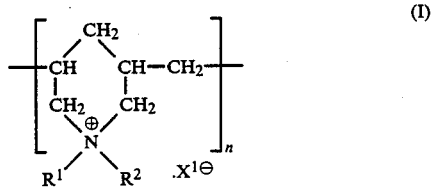

wherein $R^1$ and $R^2$ are identical or different and each represents a hydrogen atom, a lower alkyl group having 1 to 5 carbon atoms or a benzyl group, $X^1$ represents one equivalent of an anion, and n is a number showing the degree of polymerization.

23. The process of claim 19 wherein the cationic polymeric compound is an ammonium salt represented by the followin formula (II)

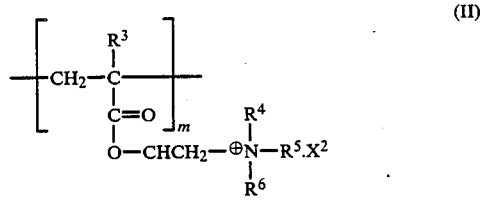

wherein $R^3$ represents a hydrogen atom or a methyl group, $R^4$, $R^5$ and $R^6$ are identical or different and each represents a hydrogen atom, a lower alkyl group having 1 to 5 carbon atoms, or a benzyl group, $X^2$ represents one equivalent of an anion, and m is a number showing the degree of polymerization.

24. The process of claim 19 wherein the cationic polymeric compound is an ammonium salt represented by the following formula (III)

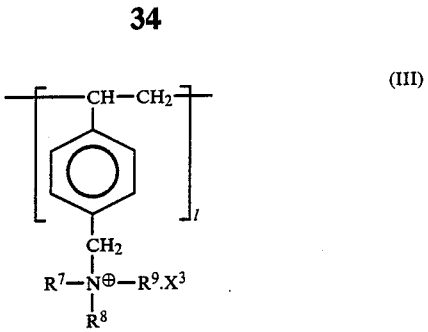

wherein $R^7 R^8$ and $R^9$ are identical or different and each represents a hydrogen atom, a lower alkyl group having 1 to 5 carbon atoms or a benzyl group, $X^3$ represents one equivalent of an anion, and l is a number showing the degree of polymerization.

25. The process of claim 19 wherein the cationic polymeric compound has a number average molecular weight of 1,000 to 100,000.

26. The process of claim 19 wherein the cationic polymeric compound is used in an amount of 0.0005 to 0.4 part by weight per one part by weight of the water-soluble anionic polymeric compound.

27. The process of claim 1 wherein the coagulation reaction in step (2) is carried out while the resulting dispersion is being mixed.

28. The process of claim 1 wherein the coagulation by heating in step (2), (i) is carried out at a temperature above the boiling point of carbon disulfide.

29. The process of claim 1 wherein the coagulation with the coagulating agent in step (2), (i) is carried out at a temperature of 0° to 40° C.

30. The process of claim 1 wherein the coagulating agent used in step (2), (i) is a lower aliphatic alcohol, an alkali metal salt of an inorganic acid, an alkaline earth metal salt of an inorganic acid, an inorganic acid, an organic acid, or a mixture of these with each other or with a water-soluble polymeric compound.

31. The process of claim 1 wherein the acid used for neutralization in step (2), (i) is an inorganic strong acid.

32. The process of claim 1 wherein the coagulation and neutralization in step (2), (ii) are carried out at a temperature of 0° to 40° C.

33. The process of claim 1 wherein the acid used for coagulation and neutralization in step (2), (ii) is an inorganic strong acid.

34. A process for producing fine cellulose particles, which comprises
   (1) mixing viscose with a water-soluble polyethylene glycol, or a derivative thereof, having a number average molecular weight of at least 1,500, at a temperature of at least 55° C., and forming a dispersion of fine droplets of the viscose dispersed in an aqueous mother liquor,
   (2) (i) heating the dispersion at a temperature equal to, or higher than, the temperature used in forming the dispersion, or mixing the dispersion with a coagulating agent to thereby coagulate the viscose in the dispersion, and thereafter neutralizing the dispersion with an acid to form fine particles of cellulose dispersed in said aqueous mother liquor, or (ii) coagulating and neutralizing the above dispersion with an acid to form fine particles of cellulose dispersed in said aqueous mother liquor, and
   (3) thereafter, separating the fine particles of cellulose from the mother liquor.

35. The process of claim 34 wherein the polyethylene ethylene glycol or derivative thereof has a number average molecular weight of 1,500 to 400,000.

36. The process of claim 34 wherein the polyethylene glycol derivative is a water-soluble compound obtained by blocking only the hydroxyl group of one end of polyethylene glycol with an alkyl group having 1 to 18 carbon atoms, a phenyl group substituted by an alkyl group having 1 to 18 carbon atoms, or an acyl group having 2 to 18 carbon atoms, or an A-B-A' block copolymer (wherein A and A' are identical or different and each represents a polyethylene oxide block, and B represents a polypropylene oxide block).

37. The process of claim 34 wherein, in said mixing step (1), an aqueous solution containing 0.5 to 60 % by weight of said water-soluble polyethylene glycol or derivative thereof is mixed with said viscose.

38. The process of claim 34 wherein the viscose and polyethylene glycol or derivative thereof are mixed in such proportions that 1 to 30 parts of polyethylene glycol or derivative thereof is used per one part by weight of cellulose.

39. The process of claim 34 wherein the coagulation by heating or by using a coagulating agent in step (2), (i) is carried out at a temperature of 60° to 90° C.

40. The process of claim 34 wherein the coagulation and neutralization in step (2), (ii) are carried out at a temperature of 60° to 90° C.

41. The process of claim 1 wherein the water-soluble anionic polymeric compound is a homopolymer or copolymer containing at least 20 mole % of the monomeric units of acrylic acid, methacrylic acid, styrenecarboxylic acid, maleic acid, itaconic acid and salts of said acids.

42. The process of claim 1 wherein the water-soluble anionic polymeric compound is a homopolymer or copolymer containing at least 20 mole % of the monomeric units of styrenephosphonic acid, vinylphosphonic acid and salts of said acids.

* * * * *

UNITED STATES PATENT AND TRADEMARK OFFICE
CERTIFICATE OF CORRECTION

PATENT NO. : 4 902 792
DATED : February 20, 1990
INVENTOR(S) : Shigeru OKUMA et al It is certified that error appears in the above-identified patent and that said Letters Patent is hereby corrected as shown below:

Column 32, line 26; after "alkali" insert a comma.
           line 37; after "thereof" insert a comma.
Column 33, line 4; change "animonic" to ---anionic---.
           line 48; change "followin" to ---following---.
           line 56; change "$O-CHCH_2-$" etc. to
                    --- $O-CH_2CH_2-$ etc. ---.
Column 34, line 13; change "$R^7R^8$" to ---$R^7$, $R^8$---.
Column 35, line 2; delete "ethylene".

Signed and Sealed this

Sixteenth Day of July, 1991

Attest:

HARRY F. MANBECK, JR.

Attesting Officer        Commissioner of Patents and Trademarks